United States Patent
Andre et al.

(10) Patent No.: US 7,685,476 B2
(45) Date of Patent: Mar. 23, 2010

(54) EARLY NOTIFICATION OF ERROR VIA SOFTWARE INTERRUPT AND SHARED MEMORY WRITE

(75) Inventors: Herve Gilbert Philippe Andre, Tucson, AZ (US); Stephen LaRoux Blinick, Tucson, AZ (US); Scott Alan Brewer, Tucson, AZ (US); Chiahong Chen, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 11/531,183

(22) Filed: Sep. 12, 2006

(65) Prior Publication Data

US 2008/0126651 A1 May 29, 2008

(51) Int. Cl.
*G06F 11/00* (2006.01)
(52) U.S. Cl. ......................................................... 714/48
(58) Field of Classification Search .................... 714/48
See application file for complete search history.

(56) References Cited

U.S. PATENT DOCUMENTS

| 6,000,043 A * | 12/1999 | Abramson ................... 714/44 |
| 6,151,688 A | 11/2000 | Wipfel et al. |
| 6,272,618 B1 * | 8/2001 | Tyner et al. .................. 712/31 |
| 6,983,337 B2 | 1/2006 | Diamant |
| 2003/0005247 A1 | 1/2003 | Chang |
| 2005/0021847 A1 | 1/2005 | Rothman et al. |
| 2005/0160210 A1 | 7/2005 | Watt et al. |

* cited by examiner

*Primary Examiner*—Scott T Baderman
*Assistant Examiner*—Jigar Patel
(74) *Attorney, Agent, or Firm*—Griffiths & Seaton PLLC

(57) ABSTRACT

A method of providing error notification in a storage subsystem includes writing a first defined value by a host adapter of the storage subsystem to a system management interrupt (SMI) register to generate a hardware interrupt, registering and handling the hardware interrupt by a kernel module of the storage subsystem, writing a second defined value to a shared memory location of the storage subsystem by the kernel module, and reading a shared memory offset value by the host adapter. A system for providing error notification in a storage subsystem includes a controller including a serial management interface (SMI) register subcomponent, a first processing component connected to the controller having a kernel module, and a second processing component connected to the controller executing host adapter software.

11 Claims, 2 Drawing Sheets

EARLY NOTIFICATION OF ERROR VIA SOFTWARE INTERRUPT AND SHARED MEMORY WRITE

BACKGROUND OF THE INVENTION

1. Field of the Invention

The present invention relates in general to computers, and, more particularly, to an error management system and method in a storage subsystem.

2. Description of the Prior Art

Storage subsystems having a plurality of subcomponents are increasingly apparent in the art. A particular storage subsystem consists of two controller cards which are connected through a backplane. Each of the two controller cards houses two main processors and a processor bridge, as well as various other integrated components, and acts as a separate entity with redundancy capabilities. One main processor runs Linux and houses a proprietary "Shark" user mode program and kernel module, while the other processor runs a proprietary host adapter software and no third party operating system. The two processors typically only communicate through peripheral component interconnect (PCI) data transfers and through control words written to the mailbox 0 register in the processor bridge.

When the server processor hangs, or a user mode process dies or is killed unexpectedly, one typically does not have time to notify the host adapter code to drop light to (disconnect from) the host(s). Therefore, the host adapter will continue to accept new requests from the host and will keep sending the requests asynchronously to the server processor for processing.

One solution to the lack of notification time has long been known in the art, referred to as the "suicide panic," in which the host adapter will notice that it has not received mail (structured data sent to a specific location across the PCI bus) from the server in some number of seconds, then decide on its own to drop light to the host(s). However, this implementation has several drawbacks. The current design does not confirm in any way that the server processor is hung or that the user mode process has exited. It merely waits some amount of time and then disconnects, as described.

In addition, there are several scenarios in certain topologies in which it is normal for the server to not send mail to the host adapter for a long period of time (e.g., failover/failback). Since the server processor and host adapter share a memory controller, resetting the adapter means that the entire system must also be rebooted. One cannot afford to lower the time limit to a value that might be in the range of a normal recovery action since effecting a suicide panic on a host adapter serves to take down the entire system. Thus, the current timeout value for certain scenarios is set to approximately 800 seconds. This value is unacceptable because it is considerably larger than some hosts will allow their input/output (I/O) requests to be held out for.

Thus, a need exists for an error notification implementation which significantly reduces the timeout value to less than 15 seconds (the default value for some hosts) to avoid a loss of access on the hung paths.

SUMMARY OF THE INVENTION

In one embodiment, the present invention is a method of providing error notification in a storage subsystem, comprising writing a first defined value to a system management interrupt (SMI) register to generate a hardware interrupt by a host adapter of the storage subsystem, registering and handling the hardware interrupt by a kernel module of the storage subsystem, writing a second defined value to a shared memory location of the storage subsystem by the kernel module, and reading a shared memory offset value by the host adapter of the storage subsystem.

In another embodiment, the present invention is a system for providing error notification in a storage subsystem, comprising a controller including a system management interrupt (SMI) register subcomponent, a first processing component connected to the controller, the first processing component including a kernel module, and a second processing component connected to the controller, the second processing component executing host adapter software, wherein upon an absence of peripheral component interconnect (PCI) mail communication from the first processing component over a predefined period of time the controller writes a first defined value to the SMI register to generate a hardware interrupt, and the kernel module registers the hardware interrupt and writes a second defined value to a shared memory location of the storage subsystem.

In another embodiment, the present invention is a method of providing error notification in a computer system, comprising determining a system event characterized by a lack of peripheral component interconnect (PCI) mail emanating from a processing subcomponent of the computer system over a predetermined period of time, generating a first defined value by a host adapter upon the system event, the defined value written to a system management interrupt (SMI) register to cause a hardware interrupt, registering the hardware interrupt using a kernel module located in the processing subcomponent, writing a second defined value to a shared memory location of the computer system, reading a shared memory offset value by a host adapter of the computer system, wherein if the shared memory offset value differs from the second defined value, the host adapter disconnects from a host.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
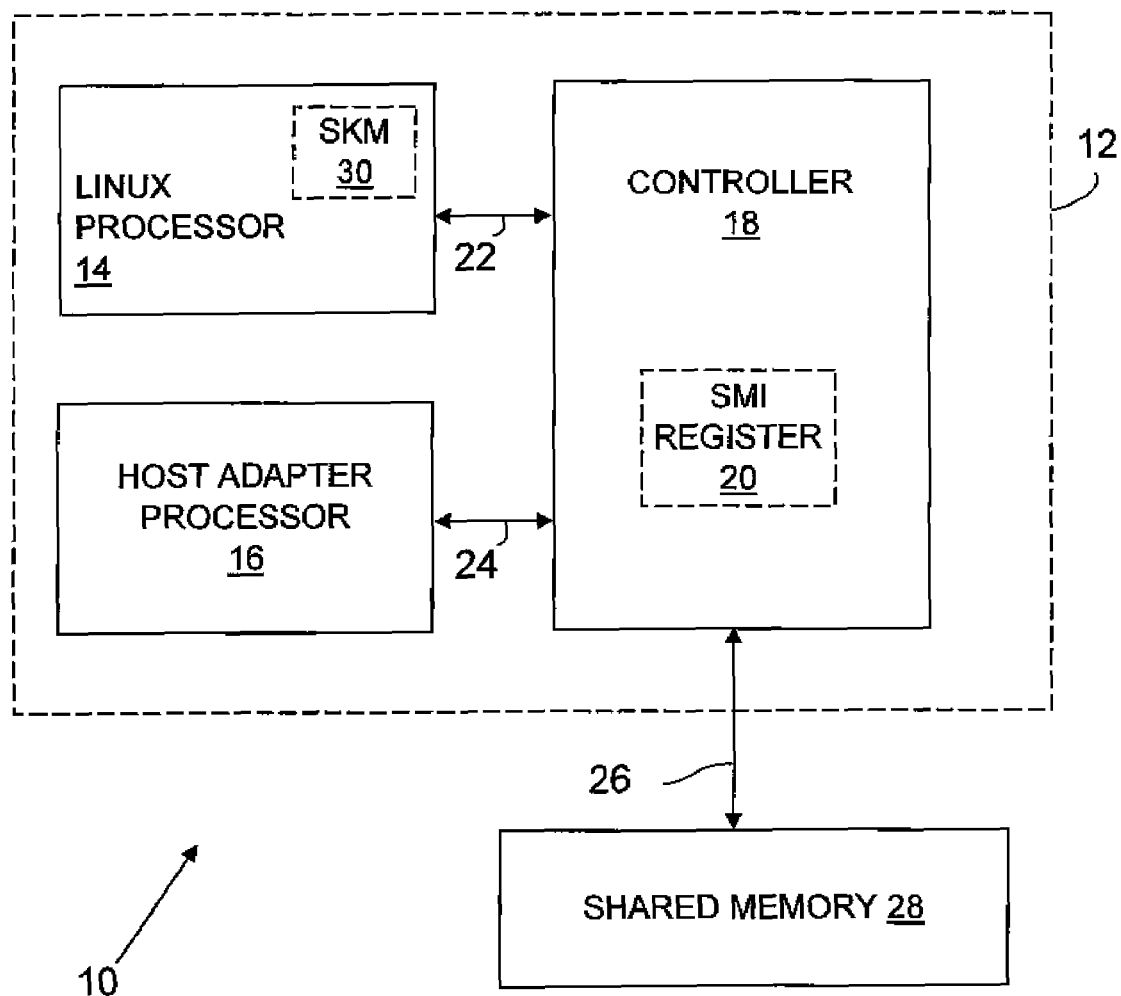
FIG. 1 illustrates an example storage subsystem for implementing early error notification according to the present invention.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Turning to FIG. 1, an example storage subsystem 10 for implementing an early error notification scheme according to the present invention is depicted. Subsystem 10 includes a controller card 12. Controller card 12 has an embedded processor 14 and a host adapter processor 16, which are connected to a controller 18 having a system management interrupt (SMI) register 20. Processor 14 can include a server processor 14 running a Linux operating system on storage subsystem 10. Controller 18 can further comprise a processor bridge, or a similar processing subcomponent which serves as a main memory controller, PCI bridge, and interrupt controller. Controller 18 can include additional host adapter hardware as needed for a particular application.

Controller 18 is connected to processors 14, 16 through signal bearing mediums 22, 24. The processors 14, 16 typically only communicate through PCI data transfers and through control words written to the mailbox 0 register in controller 18. Signal bearing medium 26 connects controller card 12 with shared memory 28. Shared memory 28 can include such devices as mass storage devices arranged in a redundant array of independent disks (RAID) topology, just-a-bunch-of-disks (JBOD) topology, or an equivalent. In addition, shared memory 28 can include devices having volatile random-access memory (RAM).

In addition to an external shared memory 28 component, controller card 12 can be connected to a host of other external components, controllers, subsystems, networks, and servers via signal bearing mediums 26 or an equivalent. Controller card 12 can be connected through a signal bearing medium to a server processor (not shown) which provides processing for a plurality of controller cards 12. A plurality of controller cards 12 can include substantially the same subcomponents as depicted to provide redundancy capabilities in an overall computer system. Finally, a kernel module 30 is shown incorporated into the Linux processor 14.

The present invention contemplates a system and method for allowing a host adapter in a computer storage subsystem to more quickly drop light to host(s) without the risk of a false trigger due to a recovery action in progress. The implementation of the present invention by using the embodiments described, or by use of additional related embodiments, reduces the time from approximately 800 seconds to less than 15 seconds between the time when I/O requests can no longer be processed to when they are no longer accepted by the host adapter.

Figure 2:
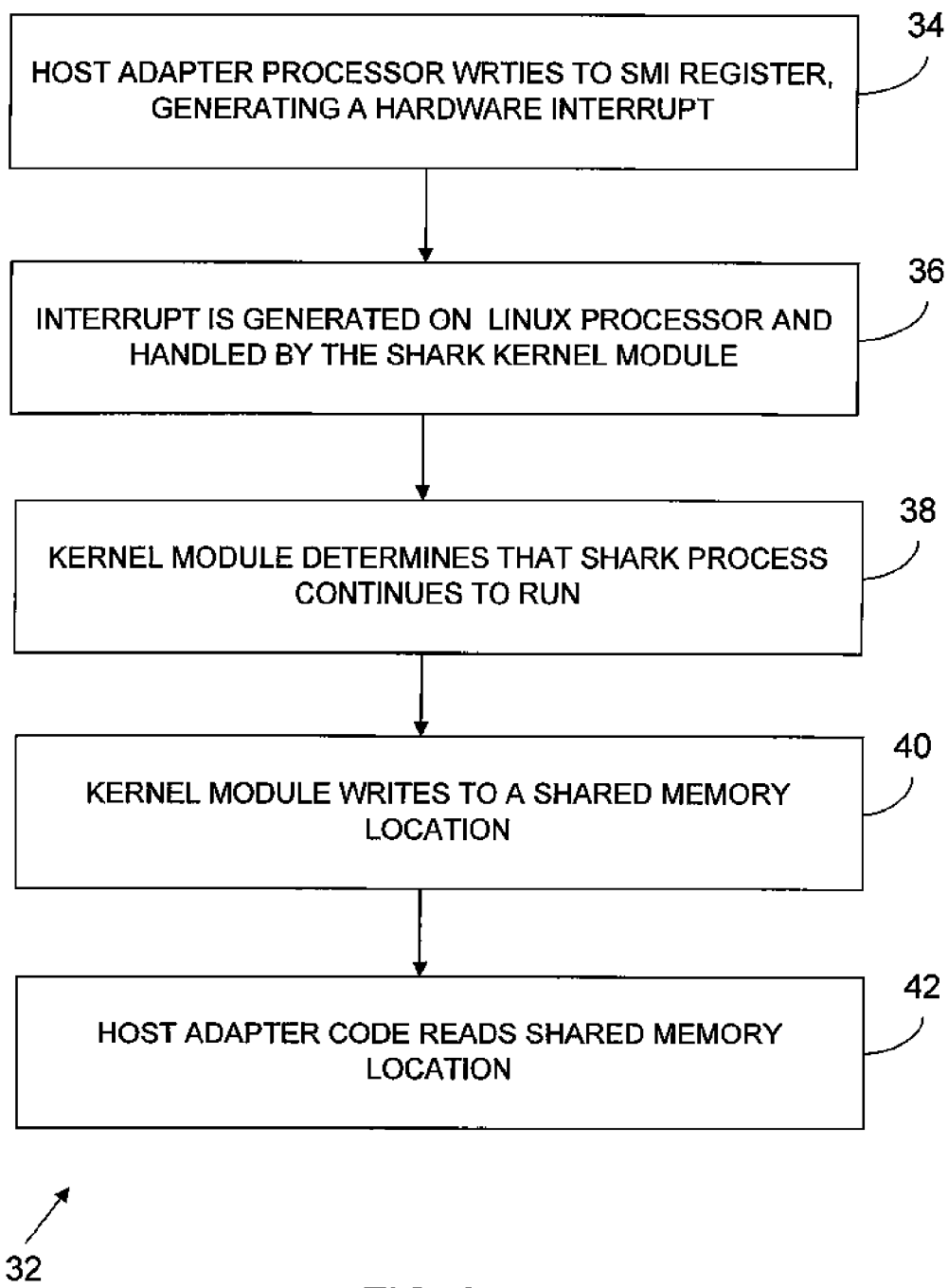
FIG. 2 illustrates an example method for implementing early error notification in a storage subsystem according to the present invention.

Turning to FIG. 2, an example method of implementing an early notification in a storage subsystem according to the present invention is depicted. The present invention makes use of a combination of a software-generated interrupt, and a shared memory write to facilitate communication between processing components in the storage subsystem. As a first step, when there has been no PCI mail communication from the Linux processor for some agreed upon or predetermined amount of time, the host adapter processor writes a first defined value to the SMI register of the processor bridge or related controller (step 34). Writing this register causes an interrupt to be generated on the Linux processor. In one embodiment, the interrupt can be registered for and handled by a kernel module located on the Linux processor (step 36).

As a next step, seeing that the interrupt message is, functionally speaking, a "reverse heartbeat message," the kernel module will set an agreed upon offset or second defined value in a well-known shared memory location to signal to the host adapter that the user mode process is still running (steps 38, 40). The host adapter reads the shared memory offset some amount of time later (step 42), e.g., after a predetermined wait period has expired. If the offset location later read by the host adapter differs from the second defined value which was earlier written by the kernel module, a determination can be made that the server function is no longer active. As a result, turn off light on the host adapter ports can be performed immediately, well in advance of the typical 800 second current timeout period.

Software and/or hardware to implement the method previously described, such as the described host adapter code to write a defined value to the SMI register, can be created using tools currently known in the art. The implementation of the described system and method involves no significant additional expenditure of resources or additional hardware than what is already in use in specific storage subsystems, making the implementation cost-effective.

Implementing and utilizing the example systems and methods as described can provide a simple, effective method of providing earlier error notification in a computer storage subsystem. While one or more embodiments of the present invention have been illustrated in detail, the skilled artisan will appreciate that modifications and adaptations to those embodiments may be made without departing from the scope of the present invention as set forth in the following claims.

What is claimed is:

1. A method for providing error notification in a storage subsystem including a host adapter in communication with a host computing system and including a first processor and a second processor coupled to each other and to a shared memory via a controller including a system management interrupt (SMI) register, the method comprising the steps of:
   detecting, by the first processor, a lack of mail communication from the second processor;
   writing, by the first processor, a first defined value to the SMI register to generate a hardware interrupt in the second processor;
   writing, by the second processor, a second defined value to the shared memory location in response to the hardware interrupt;
   reading, by the first processor, the second defined value in the shared memory; and
   disconnecting the host adapter from the host computing system, by the first processor, if the second defined value is different than a predetermined offset value.

2. The method of claim 1, wherein the detecting step occurs subsequent to a predetermined passage of time having an accompanying lack of mail communication from the second processor.

3. The method of claim 1, wherein the controller comprises a processor bridge.

4. The method of claim 1, wherein writing the first defined value to the SMI register is performed subsequent to a determination, by the first processor, of a lack of peripheral component interconnect (PCI) mail for a predetermined period of time.

5. A system for providing error notification in a storage subsystem including a host adapter in communication with a host computing device, comprising:
   a shared memory device;
   a controller including a system management interrupt (SMI) register subcomponent coupled to the shared memory device;
   a first processor coupled to the controller, the first processor comprising a kernel module; and
   a second processor coupled to the controller, the second processor executing host adapter software, wherein upon detection of an absence of peripheral component interconnect (PCI) mail communication from the first processor over a predefined period of time:
   the controller writes a first defined value to the SMI register subcomponent to generate a hardware interrupt in the first processor, and
   the kernel module registers the hardware interrupt, handles the hardware interrupt, and writes a second defined value to the shared memory device in response to the hardware interrupt, wherein subsequent to the kernel module writing the second defined value to the shared memory, the second defined value is read by the second processor to determine if the second defined value matches a predetermined offset value; and disconnecting the host adapter from the host computing device, by the second processor, if the second defined value differs from a predetermined offset value.

6. The system of claim 5, wherein the controller further comprises a memory controller, PCI bridge subcomponents, or both.

7. The system of claim 6, wherein the controller further comprises a processor bridge.

8. A method of providing error notification in a storage subsystem including a host adapter coupled to a host computer system, comprising:
   determining, by a first processor, a system event characterized by a lack of peripheral component interconnect (PCI) mail emanating from a second processor of the computer system over a predetermined period of time;
   generating, by the first processor, a first defined value upon the system event by a host adapter of the computer system, the first defined value written to a system management interrupt (SMI) register to cause a hardware interrupt in the second processor;
   registering the hardware interrupt using a kernel module located in the second processor;
   writing, by the second processor, a second defined value to a shared memory location of the computer system; and
   reading, by the first processor, the second defined value, wherein if the second defined value differs from a predetermined offset value, the first processor disconnects the host adapter from the host computer system.

9. The method of claim 8, wherein the SMI register is located in a controller device coupled to the first processor and the second processor.

10. The method of claim 9, wherein the controller device is configured to perform memory controller functions, PCI bridge functions, or both.

11. The method of claim 10, wherein the controller device further comprises a processor bridge.

* * * * *